United States Patent [19]

Lüder et al.

[11] 4,454,534
[45] Jun. 12, 1984

[54] METHOD AND APPARATUS FOR FILTERING THE LUMINANCE SIGNAL FROM ACCVS TELEVISION SIGNAL

[75] Inventors: Rainer Lüder, Oberhaching; Wolfgang Haussmann, Munich, both of Fed. Rep. of Germany

[73] Assignee: Siemens Aktiengesellschaft, Berlin & Munich, Fed. Rep. of Germany

[21] Appl. No.: 344,924

[22] Filed: Feb. 2, 1982

[30] Foreign Application Priority Data

Feb. 9, 1981 [DE] Fed. Rep. of Germany ....... 3104456

[51] Int. Cl.³ ............................................. H04N 9/535
[52] U.S. Cl. ...................................................... 358/31
[58] Field of Search .......................................... 358/31

[56] References Cited

U.S. PATENT DOCUMENTS

| | | | |
|---|---|---|---|
| 4,096,516 | 6/1978 | Pritchard | 358/31 |
| 4,158,209 | 6/1979 | Levine | 358/31 |
| 4,217,605 | 8/1980 | Carnes | 358/31 |
| 4,307,414 | 12/1981 | Lee | 358/31 |
| 4,313,131 | 1/1982 | Lee | 358/31 |
| 4,353,093 | 10/1982 | Durbin | 358/31 |

OTHER PUBLICATIONS

"Charge Transfer Devices", 1975, C. H. Sequin and M. F. Tompsett, Academic Press, pp. 48–61.

*Primary Examiner*—Michael A. Masinick
*Attorney, Agent, or Firm*—Herbert L. Lerner; Laurence A. Greenberg

[57] ABSTRACT

Method for filtering the luminance signal from a CCVS television signal, which includes sampling the CCVS signal in a CTD filter with twice the color carrier frequency, converting the CCVS signal into a charge packet proportional to its voltage, dividing the charge packet into first and second charge parts in a ratio of 1:1, conducting the first and second charge parts through separate branches, delaying the first charge part relative to the second charge part by one given sampling period in the branches, and subsequently recombining the charge parts in an output channel, and an apparatus for carrying out the method.

2 Claims, 6 Drawing Figures

METHOD AND APPARATUS FOR FILTERING THE LUMINANCE SIGNAL FROM ACCVS TELEVISION SIGNAL

BACKGROUND OF THE INVENTION

1. Field of the invention

The invention relates to a method and an apparatus for filtering the luminance signal out of a CCVS television signal.

2. Description of the Prior Art

In the color signal part of a color television receiver, the video frequency CCVS (Composite Color Video Signal) is split into the luminance signal (light density signal) and the chrominance signal (color hue signal). The chrominance signal is then demodulated according to the color demodulation method (PAL, SECAM, NTSC) and these color signals and the luminance signal are fed to the picture tube through a matrix.

The separation of the chrominance components of the CCVS-signal required for obtaining the luminance signal is customarily accomplished in a "color trap" which sufficiently suppresses the color spectrum from 3.1 to 5 MHz. An LC-turned circuit is usually used as the color trap. This may be a series-resonant circuit connected into the collector circuit of a transistor driven by the CCVS-signal, the band width of which can be adjusted by a shunt resistance.

Such filters constructed from coils and/or capacitors, however, have a non-linear phase response, which leads to a distortion of the pulse response which is visible in the picture. Firstly, these filters have a poor time behavior, since each luminance jump excites the tuned circuit to perform a damped oscillation. Secondly, troublesome transients also occur if the phase of the color carrier is changed heavily, such as in the transition from green to purple.

If expensively constructed quadrupoles are used as the color trap, the time behavior of the luminance channel is only slightly improved.

SUMMARY OF THE INVENTION

It is accordingly an object of the invention to provide a method and apparatus for filtering the luminance signal from an CCVS television signal, which overcomes the hereinafore-mentioned disadvantages of the heretofore-known methods and devices of this general type, and which provides for an improved time behavior of the luminance channel.

With the foregoing and other objects in view there is provided, in accordance with tthe invention, a method for filtering the luminance signal from an CCVS television signal, which comprises sampling the CCVS signal in a CTD filter with twice the color carrier frequency, converting the CCVS signal into a charge packet proportional to its voltage, dividing the charge packet into first and second charge parts in a ratio of 1:1, conductingg the first and second charge parts through separate branches, delaying the first charge part in time relative to the second charge part by one given sampling period in the branches, and subsequently recombining the charge parts in an output channel. With this method it is possible to provide a filter that has a null or zero at the color carrier frequency. For a sampling frequency corresponding to two-times the color carrier frequency ($2f_{FT}=8.867$ MHz in the PAL-standard), undersampling of the luminance signal takes place. The folding products produced in the frequency range 4–5 MHz therefore remain without interfering on the picture quality, since the luminance and chrominance components fall between multiples of the line frequency in the convolution, where they are hardly noticed, subjectively speaking.

A rise in the frequency response above 2 MHz can advantageously be achieved in accordance with another mode of the invention by providing a method which comprises performing the sampling of the FBAS television signal to be filtered in three separate input stages with twice the color carrier frequency, performing the converting of the signal by forming first, second and third charge input packets proportional to its voltage delaying the first charge input packet in time relative to the second charge input packet by one sampling period, delaying the third charge input packet relative to the second charge input packet by two sampling periods, and combining the three input stages in a main channel for subsequently performing the dividing of the charges.

In accordance with an apparatus for implementing a method for filtering the luminance signal from a CCVS television signal there is provided an input stage for sampling the CCVS television signal with twice the color carrier frequency and converting the CCVS signal into a charge packet proportional to its voltage, a splitting stage connected to the input stage for dividing the charge packet into first and second charge parts in a ratio of 1:1, a delay stage connected to the splitting stage for delaying the first charge part relative to the second charge part by one sampling period, a recombination stage connected to the delay stage for recombining the first and second charge parts, and a common output channel connected to the recombination stage.

In accordance with another feature of the invention, the input stage is in the form of first, second and third separate but jointly addressed input channels, and including a common main channel in which the input channels are joined together for receiving signals from the input channels, the input channels including means for delivering the signal from the second input channel to the main channel one given sampling period earlier than the signal from the first input channel and means for delivering the signal from the third input channel to the main channel one sampling period later than the signal from the first input channel.

In accordance with a further feature of the invention, the input channels have gate electrodes, and the area of the gate electrode of the second or third input channel under which the charge packet proportional to the input voltage is formed is between 10% and 30% of the area of the corresponding gate electrode of the first input channel.

In accordance with a concomitant feature of the invention, the second and third input channels are inverting as compared to the first input channel.

Other features which are considered as characteristic for the invention are set forth in the appended claims.

Although the invention is illustrated and described herein as embodied in a method and apparatus for filtering the luminance signal from a CCVS television signal, it is nevertheless not intended to be limited to the details shown, since various modifications and structural changes may be made therein without departing from the spirit of the invention and within the scope and range of equivalents of the claims.

BRIEF DESCRIPTION OF THE DRAWING

The construction and method of operation of the invention, however, together with additional objects and advantages thereof will be best understood from the following description of specific embodiments when read in connection with the accompanying drawings, in which.

DESCRIPTION OF THE PREFERRED EMBODIMENT

Figure 1:
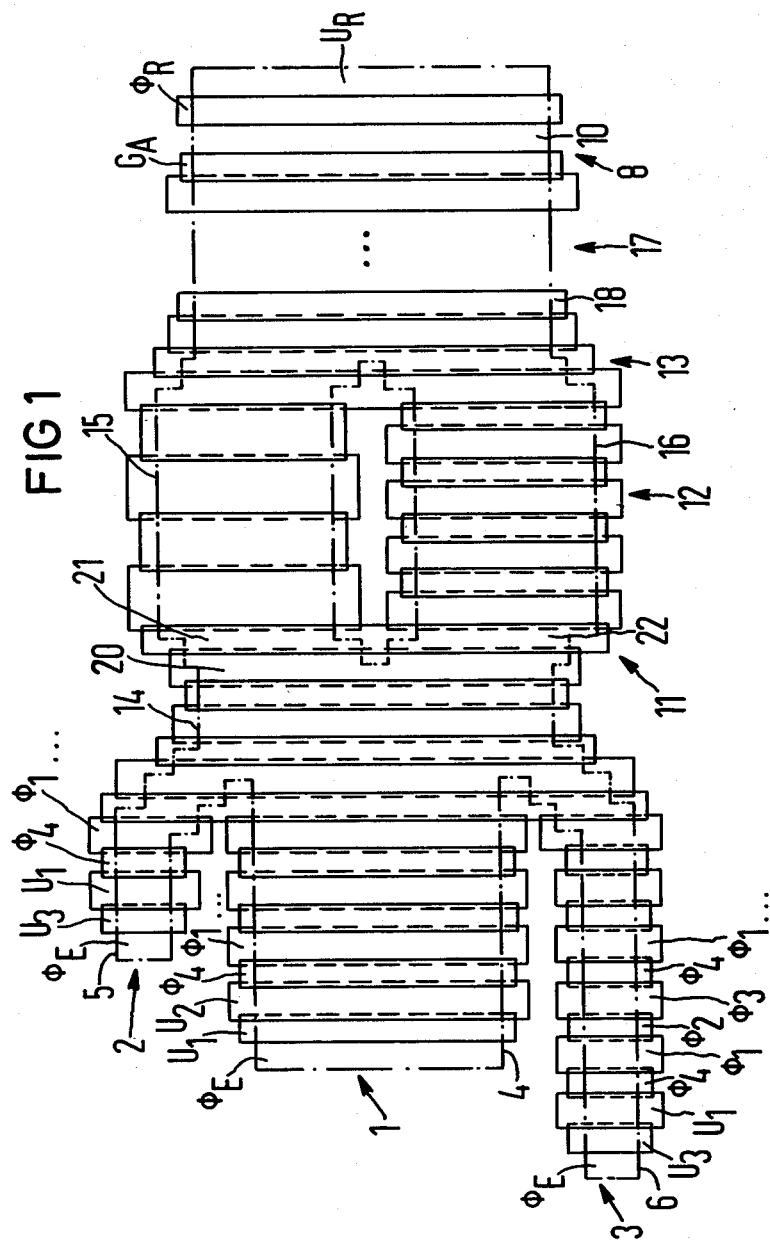
FIG. 1 is a diagrammatic view of an embodiment constructed as a CCD (Charge-Coupled Device), for a device for carrying out the method according to the invention.

Referring now to the figures of the drawing and first particularly to FIG. 1 thereof, there are seen the charge transfer channels and the electrode configuration of a CTD (Charge Transfer Device) filter constructed in the form of a CCD which serves for carrying out the method according to the invention. The filter chosen as the embodiment example is a four-phase circuit, with three separate but jointly addressed input stages 1, 2, 3, which work in accordance with the so-called "Fill and Spill" method.

Putting charges into the input potential trough of a CCD according to the "Fill and Spill" method is known and described in detail in the publication by C. H. Sequin and M. F. Tompsett entitled "Charge Transfer Devices", 1975, Academic Press, and particularly on pages 48 to 61 thereof.

The three input stages 1, 2, 3 are tied together in a common main channel 14. The main channel 14 is divided in a splitting stage 11 into two channels 15, 16 which form the delay stage 12, and which are subsequently recombined in a combination stage 13 leading to the output channel 18. The signal is subsequently further delayed in a luminance delay stage 17 to obtain a propagation time equalization between the luminance channel and the chrominance channel, and is fed out in the output stage 8.

The three input stages 1, 2, 3 of the CCD-filter each have a transfer channel 4, 5, 6, respectively, (shown in dot-dash lines), above which different gate electrodes are disposed in a known manner. The input signal applied to the electrodes $U_1$ of each input stage 1, 2, 3 is sampled by means of an input clock frequency $\phi_E$ which is identical for all input stages 1, 2, 3, is applied to input diodes, and corresponds to twice the color carrier frequency (in the PAL-standard, 8.867 MHz). Signals $U_2$ and $U_3$ are auxiliary signals (d-c voltages). A storage cell of the four-phase CCD has four electrodes which are addressed by the clock phases $\phi_1$, $\phi_2$, $\phi_3$ and $\phi_4$. The clock frequencies are identical with the sampling frequency, while the phases are each shifted by one-quarter of a period. The input stage 2 has one storage cell; the input stage 1 has two storage cells; and the input stage 3 has three storage cells. Since the three channels 4, 5, 6 of the input stages 1, 2, 3 are combined in a main channel 14, the input signal reaches the main channel 14 through the input stage 2 one clock period earlier than through the input stage 1, while the input signal reaches the main channel 14 through the input stage 3 one clock period later than through the input stage 1. In the main channel 14, the signals of the input stages 1, 2, 3 are summed, so that the filter produced in this manner has the following transmission characteristics, z-transformed:

$$H_2(z) = \frac{y(z)}{x(z)} = K_2 + K_1 z^{-1} + K_3 z^{-2}$$

in which:
x(z) = input signal
y(z) = Output signal
$K_1$, $K_2$, $K_3$ = weighting coefficients
$z = e^{j\omega T}$, T = clock period.

The color trap is provided by the provision that the main channel 14 is split in the splitting stage 11 into two equal-area parts 15 and 16, and the split channels 15 and 16 are subsequently recombined in the recombination stage 13 and lead to the output channel 18. Since the channel 16 has one more storage cell than channel 15, the signal present in the combination stage 13 is proportional to the sum of the undelayed signal of the splitting stage 11 on one hand, and the signal of the splitting stage 11 delayed by one clock period on the other hand.

In the splitting stage 11, the charge packet under the electrode 20 is divided into two equally large charge parts located under the electrodes 21 and 22. An exact subdivision in the ratio 1:1 can be achieved in a technologically simple manner by providing an identical construction of the channels 15 and 16 of the electrodes 21 and 22. The signal, which is delayed by one sampling period in the channel 15 equipped with four clock electrodes, is summed in the combination stage 13 with the signal delayed by two sampling periods in the channel 16 equipped with eight clock electrodes. In this way the CCD-filter including the stages 11, 12 and 13 has the transmission characteristic $H_1(z) = (0.5 + 0.5z^{-1})$.

Figure 2:
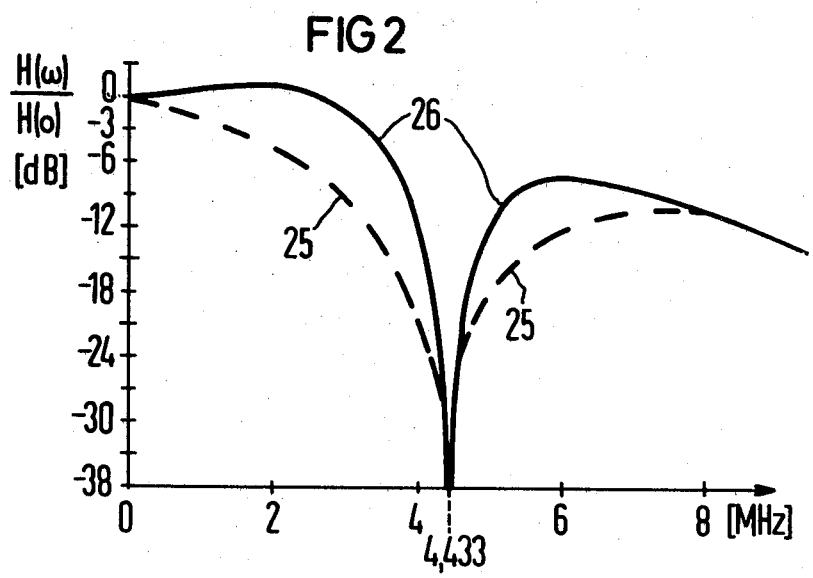
FIG. 2 is a graphical ilustration of the frequency response of a device according to the invention.

The filter acts as a color trap because it has a null or zero at the color carrier frequency. The frequency response of a corresponding filter which works with twice the color carrier frequency as the sampling frequency is shown in FIG. 2 as the curve 25. With the sampling frequency $f_A = 2 f_{FT} + 8.867$ MHz, undersampling of the luminance signal occurs, whereby convolution products (aliasing) in the frequency range 4 MHz < f < 5 MHz are produced. These, however, have no disturbing influence on the picture quality since, for one thing, the usual IF-filter attenuates spectrum components of the video signal with frequencies higher than the color carrier frequency; secondly, the luminance and chrominance components fall between multiples of the line frequency in the convolution, where they are noted less strongly subjectively; and thirdly, the luminance filter according to the invention suppresses just these spectrum components.

Choosing four times the color carrier frequency as the sampling frequency provides no substantial advantages relative thereto but does increase the technological requirements in the CCD-filter as well as the cost of the clock generation.

Since a color trap including only the stages 11, 12 and 13 in conjunction with the sample and hold process taking place in an input stage leads to a distinct increase of the attenuation for luminance signals above 2 MHz, it is provided, in a further embodiment of the invention, to raise the frequency response of the filter above 2 MHz by the special construction of the inut stages 1, 2, 3 already described at the outset. The input stages 1, 2, 3 tied together in the main channel 14 lead to the filter function $H_2(z) = K_2 + K_1 z^{-1} + K_3 z^{-2}$.

The pulse response of this filter is determined by the choice of the coefficients $K_1$, $K_2$ and $K_3$, the absolute value, and sign of the coefficients being determined by a construction of the input stages belonging to the respective coefficients. The ratio of the absolute value of the coefficients is determined by the area ratio of the electrodes under which the charge proportional to the input voltage is formed. In other words, the effective area of the input electrodes is chosen in such a way that the ratio of these areas corresponds to the desired ratio of the coefficients. In order to ensure otherwise equal input characteristics, the physical construction and the technological fabrication of the input electrodes, or the input stages, the composition and thickness of the thin oxide lying under the electrodes and the base doping of the channel, should in particular be identical, which is comparable to the conditions in the fabrication of the splitting stage 11.

Negative signs of the coefficients $K_1$, $K_2$, $K_3$ are provided by constructing input stages which yield a negative coefficient inverting from input stages that yield a positive coefficient. In the embodiment example, this is the case for the input stages 2 and 3. If the input signal $U_1$ addresses the first electrode of the input stage, the circuit operates in a non-inverting manner. If, on the other hand, the signal $U_1$ is applied to the second electrode, an inverting behavior is obtained. In the embodiment shown in FIG. 1, the outer input stages 2, 3 accordingly operate in an inverting manner, while the middle input stage 1 operates in a non-inverting way, and the coefficients $K_2$ and $K_3$ are therefore negative while the coefficient $K_1$ is positive.

To achieve an advantageous time behavior, it is advisable to make the input stages 2 and 3 inverting as compared to the input stage 1, and to make the areas of the gate electrode receiving the input signal $U_1$ of the input stages 2 and 3, under which the charge packets proportional to the input voltage are formed, in such a way that they are 10–30% of the corresponding area of the gate electrode receiving the input signal $U_2$ of the input stage 1.

Because of the high clock frequency of about 8.86 MHz, it is advisable to make the channels 4, 5, 6 between the input stages 1, 2, 3 and that of the tie in to the main channel 14 in such a manner that the path of the charge carriers to be travelled from electrode to electrode is increased as little as possible. As shown in FIG. 1, this can be accomplished advantageously by making the channels 5 and 6 of the input stages 2 and 3 pointing to the middle channel 4 in staircase fashion, and by accordingly shifting the electrodes belonging to the channels in their lengthwise direction from electrode to electrode.

In the luminance delay stage 17, the CCD-filter according to the invention can be constructed by supplementation of fewer electrodes in such a manner that the group delay time of the luminance channel corresponds to that of the chrominance branch of the color decoder.

The construction of the output stage 8, in which the charge packet that is summed in the combination stage 13, and is optionally delayed through the luminance delay stage 17, is converted into a proportional voltage, is known, for instance, from the above-mentioned publication "Charge Transfer Devices". In FIG. 1, the output gate is designated with reference symbol $G_A$, the reset clock with reference symbol $\phi_R$ and the reset voltage with reference symbol $U_R$. The output signal is fed to an output circuit through a connection 10. The embodiment example shown operates with a four-phase clock and is manufactured in CCD-technology. However, it is equally possible to construct the filter according to the invention with another CTD-technique, for instance as a BBD (Bucket-Brigade Device) and/or with other types of clocks, such as with a 2 or 3 phase clock.

An example of the actual construction of the device will now be given:

An embodiment for implementing the method according to the invention was constructed in such a way that the coefficients $K_2$ and $K_3$ were given the values $-0.15$, and the coefficient $K_1$ was given the value 0.7. The channel widths of the input stages 2 and 3 are 15 $\mu$m, and the channel width of the input stage 1 is 70 $\mu$m. In order to keep the charge loss low, the channels of the two inverting input stages 2 and 3 are brought piecewise, through parallel shifting of the electrodes, to the 70 $\mu$m wide channel 4 of the input stage 1 and are finally connected to the main channel 14. The color trap including the stages 11, 12 and 13 is constructed in the same manner. The length of the electrodes is 7 $\mu$m.

A line 26 in FIG. 2 shows the frequency response of the CCD-luminance filter obtained for a sampling frequency (8.867 MHz) corresponding to twice the color carrier frequency.

The improved time behavior of the device according to the invention is presented with reference to FIGS. 3 to 6. An input signal $U_1(t)$ having the step shape shown in FIG. 3 leads to an output function $U_S(t)$ shown in FIG. 4 in the case of a color trap according to the state of the art. In such a prior art device a transistor addressed by the CCVS-signal is used; a series-resonant circuit with a parallel operating resistor is connected in the collector circuit thereof, the series resonance circuit being set with its resonance frequency to the color carrier frequency. As will be seen, such a color trap responds to the input step with a damped oscillation. The time behavior of the circuit is therefore not satisfactory.

Figure 3:
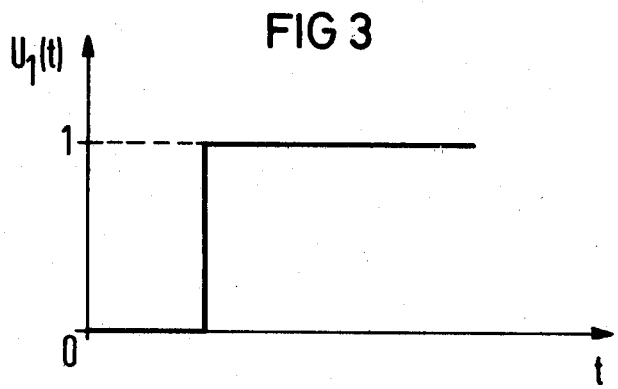
FIGS. 3 to 6 are graphical representations of different signals occuring in color traps.
Figure 4:
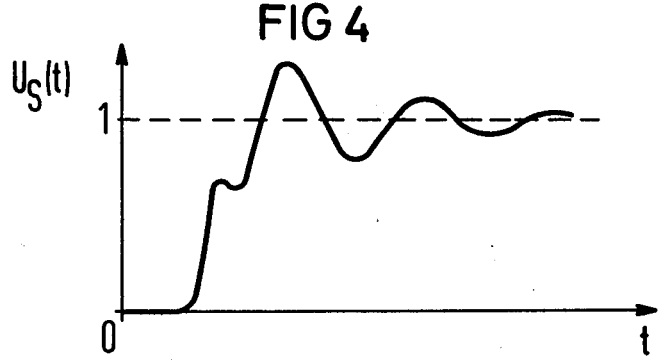
Figure 5:
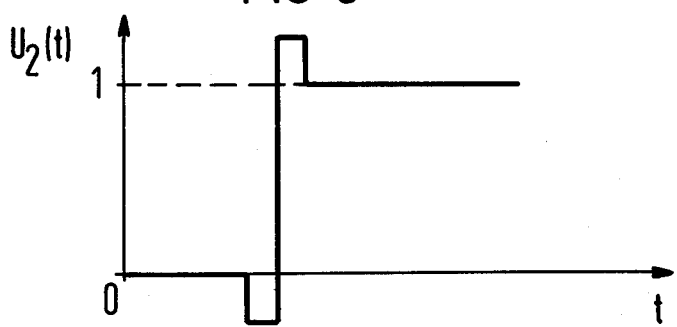
Figure 6:
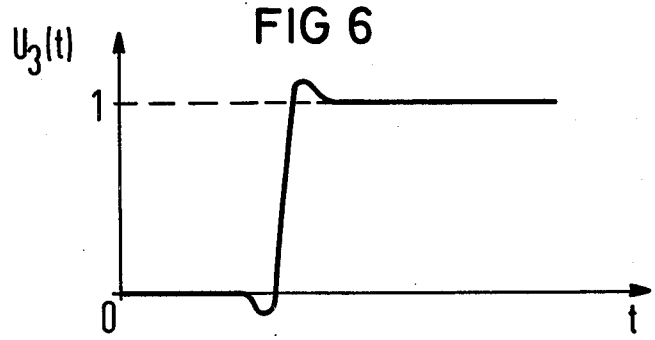

If an input signal of the step shape shown in FIG. 3, however, is applied to the input electrodes of the device according to the invention, the time function $U_2(t)$ shown in FIG. 5 is obtained at a point of the channel 14 at which all three input stages 1, 2, 3 have already been combined, but channel splitting has not yet taken place. The visible overshoot serves for raising the frequency response and is determined by the choice of the coefficients $K_1$, $K_2$, $K_3$. If the voltage $U_2(t)$ passes through the branching or delay circuit 12 and subsequently thereto passes through a lowpass filter inserted into the output circuit, then the output function $U_3(t)$ shown in FIG. 6 is obtained. As compared to the time function $U_S(t)$ of FIG. 4, the improved time behavior of the device operating in accordance with the method of the invention becomes clear.

A further advantage of such a device is the cost-effective and simple fabrication in MOS-technology and the simple construction of the luminance delay for the propagation time equalization between the luminance channel and the chrominance channel. The method according to the invention can be applied to all color television methods (PAL, NTSC, SECAM).

We claim:

1. Method for filtering the luminance signal from a CCVS television signal, which comprises sampling the CCVS signal in a CTD filter with twice the color carrier frequency, converting the CCVS signal into a charge packet proportional to its voltage, dividing the charge packet into first and second charge parts in a ratio of 1:1, conducting the first and second charge parts through separate branches, delaying the first charge part relative to the second charge part by one given sampling period in the branches, and subsequently recombining the charge parts in an output channel.

2. Apparatus for implementing a method for filtering the luminance signal from a CCVS television signal, comprising an input stage for sampling the CCVS television signal with twice the color carrier frequency and converting the CCVS signal into a charge packet proportioned to its voltage, a splitting stage connected to said input stage for dividing said charge packet into first and second charge parts in a ratio of 1:1, a delay stage connected to said splitting stage for delaying said first charge part relative to said second charge part by one sampling period, a recombination stage connected to said delay stage for recombining said first and second charge parts, and a common output channel connected to said recombination stage.

* * * * *